US011922670B2

(12) United States Patent
Noh et al.

(10) Patent No.: US 11,922,670 B2
(45) Date of Patent: Mar. 5, 2024

(54) SYSTEM FOR EXTRACTING OUTLINE OF STATIC OBJECT AND METHOD THEREOF

(71) Applicants: HYUNDAI MOTOR COMPANY, Seoul (KR); KIA Corporation, Seoul (KR)

(72) Inventors: Mi Rim Noh, Jeonju-si (KR); Byoung Kwang Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 322 days.

(21) Appl. No.: 17/365,271

(22) Filed: Jul. 1, 2021

(65) Prior Publication Data

US 2022/0058421 A1 Feb. 24, 2022

(30) Foreign Application Priority Data

Aug. 18, 2020 (KR) ........................ 10-2020-0103411

(51) Int. Cl.
*G06V 10/44* (2022.01)
*G01S 7/48* (2006.01)
*G06F 18/2413* (2023.01)

(52) U.S. Cl.
CPC ............ *G06V 10/44* (2022.01); *G01S 7/4802* (2013.01); *G06F 18/2413* (2023.01)

(58) Field of Classification Search
CPC ........ G06V 10/44; G06V 10/30; G06V 10/34; G06V 20/56; G01S 7/4802; G01S 17/89; G01S 17/931; G01S 7/4808; G06F 18/2413; G06F 17/10; G06T 7/13; G06T 7/11; G06T 11/20
See application file for complete search history.

(56) References Cited

PUBLICATIONS

"Martin Kellner et al., Laserscanner based Road Curb Feature Detection and Efficient Mapping using Local, 2014 IEEE 17th International Conference on Intelligent Transportation Systems ITSC Oct. 8-11, 2014, Qingdao, China" (Year: 2014).*
"Tao Wu et al., A Modified Method for the Estimation of SAR Target Aspect Angle based on MRF Segmentation, Proc. SPIE 7495, MIPPR 2009: Automatic Target Recognition and Image Analysis, 74953U, Oct. 2009" (Year: 2009).*

(Continued)

*Primary Examiner* — Andrae S Allison
*Assistant Examiner* — Phuong Hau Cai
(74) *Attorney, Agent, or Firm* — MORGAN, LEWIS & BOCKIUS LLP

(57) ABSTRACT

A system comprises a LiDAR sensor and a processor coupled to the LiDAR. The processor is configured to derive a regression line, and generate the outline of the static object by connecting the classified valid points except for the classified removal points. Wherein the processor is further configured to calculate an angle defined by one segment and another segment adjacent to the segment, select an i-lth point, which is a start point of a segment including an ith point, as a start point, when an angle between segments at both sides with respect to the ith point is greater than the reference angle, and select a jth point as an end point, when an angle between segments at both sides with respect to the jth point is less than or equal to the reference angle and when there is the start point before the jth point.

14 Claims, 7 Drawing Sheets

(56) References Cited

PUBLICATIONS

"Jorg Stuckler et al., In-Lane Localization in Road Networks Using Curbs Detected in Omnidirectional Height Images, Conference Proceedings of Robotik 2008, Jan. 2008" (Year: 2008).*

"Peter Dorninger et al., A Comprehensive Automated 3D Approach for Building Extraction, Reconstruction, and Regularization from Airborne Laser Scanning Point Clouds, Sensors 2008, 8, 7323-7343, Oct. 2008" (Year: 2008).*

* cited by examiner

SYSTEM FOR EXTRACTING OUTLINE OF STATIC OBJECT AND METHOD THEREOF

CROSS-REFERENCE TO RELATED APPLICATION

This application claims the benefit of priority to Korean Patent Application No. 10-2020-0103411, filed in the Korean Intellectual Property Office on Aug. 18, 2020, the entire contents of which are incorporated herein by reference.

TECHNICAL FIELD

The present disclosure relates to a system for extracting an outline of a static object and a method thereof, and more particularly, relates to technologies of removing points caused by a forest or the like except for the static object to be recognized among points clustered and recognized as one object together with the static object and extracting an outline for the state object, which is a recognized target, at high reliability.

BACKGROUND

In general, a light detection and ranging (LiDAR) sensor is used to detect surrounding things, geographic features, or the like using data obtained based on a time taken for an emitted pulse laser to be reflected from a surrounding object and return, intensity of the pulse laser, and the like and model an image based on it.

Such a LiDAR sensor has been expanded in use in various fields. Recently, the LiDAR sensor has been in the spotlight as a technology capable of playing a role as eyes of an autonomous vehicle.

Particularly, it should be able to accurately identify a current location of the vehicle for autonomous driving. It is should be able to obtain Information of a static object, such as a building or a guardrail, around the vehicle based on data obtained by the LiDAR sensor and compare the obtained information of the static object with building or guardrail information on a map for a corresponding area, which is stored in a database, to accurately recognize the location of the vehicle.

To this end, an outline of the static object, such as a building, which is generated based on data obtained by means of the LiDAR sensor, should be accurately identified. In an existing technology, there are various attempts to more accurately extract an outline of a building or the like.

However, when the LiDAR sensor emits a pulse laser to identify a static object such as a building or a guardrail, it receives the pulse laser reflected from an object, such as a tree or a forest, around the static object as well as the static object such as the building. Particularly, when the wood or the forest is clustered together with the static object, there is a very high probability that an area protruded to the outside by the tree or the forest will be verified as if forming an outline as a part of the static object.

However, when the tree or the forest is clustered together with the static object and is received together as sensing data of the LiDAR sensor together, it is not easy to select and remove only an outline or a point generated by the tree or the forest.

Thus, the outline extracted by data obtained from the LiDAR sensor is still not identical to an outline of the static object itself frequently. Because this acts as one element of degrading accuracy of autonomous driving, there is still a need to improve it.

Furthermore, the tree or the forest around the static object grows over time or easily changes in size or shape due to an external factor such as pruning or a landscaping work. It is difficult to apply an image at a specific time when such a tree or forest is included to precision location determination of an autonomous vehicle based on photos, images, or the like.

Thus, there is still a need for a means capable of improving reliability of an outline extracted based on the LiDAR sensor by suitably removing only points incidentally generated by a tree or a forest, which is detected together by the LiDAR sensor because it is around the static object, but is not the static object itself, while still maintaining the outline for identifying the appearance of the static object itself.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a system for extracting an outline of a static object to generate a regression line on the basis of continuity of angles between segments interconnecting points obtained as indicating a boundary of a static object by a LiDAR sensor and extract an outline composed of valid points which remain after removing points where a distance departing from the regression line is greater than or equal to a certain reference distance to remove points caused by a forest or the like except for the static object to be recognized among points clustered and recognized as one object together with the static object, such as a guardrail or a building, and extract the outline of the static object, which is a recognized target, at high reliability and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for extracting an outline of a static object may include a regression line generator that derives a regression line being a point selection criterion, based on linearity of segments interconnecting points obtained from a light detection and ranging (LiDAR) sensor, a point selecting device that calculates a separation distance where each point is vertically away from the regression line, when the separation distance is greater than or equal to a reference distance, classify the points as removal points, and when the separation distance is less than the reference distance, classify the points as valid points, and an outline extracting device that generates the outline of the static object by connecting the classified valid points except for the classified removal point.

In an embodiment of the present embodiment, the system may further include a regression line candidate selecting device that determines that a plurality of consecutive segments have linearity, when at least two consecutive angles, each of which is defined by a segment and another segment adjacent to the segment, are greater than a reference angle, and selects points forming the plurality of segments as a regression line candidate.

In an embodiment of the present embodiment, the regression line candidate selecting device may include a segment angle calculating device that calculates an angle defined by one segment and another segment adjacent to the segment and a reference angle comparing device that selects a start point and an end point of segments, linearity of which is consecutively recognized, when it is determined that at least two consecutive angles, each of which is between segments adjacent to each other, are greater than the reference angle.

In an embodiment of the present embodiment, the regression line generator may generate the regression line, where the sum of squares of the error with points included in the regression line candidate from the start point to the end point becomes minimum, by a least square method.

In an embodiment of the present embodiment, the point selecting device may include a separation degree calculating device that obtains the separation distance where the point is vertically away from the regression line and a point classifying device that classifies the point as the removal point, when the separation distance is greater than or equal to the reference distance, and classifies the point as the valid point, when the separation distance is less than the reference distance.

According to another aspect of the present disclosure, a method for extracting an outline of a static object may include deriving a regression line being a point selection criterion, using points forming consecutive segments, when the segments interconnecting points obtained from a LiDAR sensor have linearity to be consecutively connected to each other, calculating a separation distance where each point is vertically away from the regression line and comparing the separation distance with a reference distance to select a removal point to be deleted and a valid point to remain, and generating the outline of the static object by connecting the remaining valid points.

In another embodiment of the present embodiment, the method may further include selecting points forming consecutive segments as a start point and an end point to generate the regression line, when at least two segments have linearity to be consecutively connected to each other.

In another embodiment of the present embodiment, the selecting of the points forming the consecutive segments as the start point and the end point may include calculating an angle between segments adjacent to each other and determining that the segments have linearity to be consecutively connected to each other, when at least two consecutive angles, each of which is between the segments adjacent to each other, are greater than a reference angle, and selecting a start point and an end point of the consecutive segments as a regression line candidate.

In another embodiment of the present embodiment, the selecting of the removal point to be deleted and the valid point to remain may include calculating the separation distance which is a degree to which each point is vertically away from the regression line and classifying the point as the removal point, when the separation distance is greater than or equal to the reference distance, and classifying the point as the valid point, when the separation distance is less than the reference distance.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
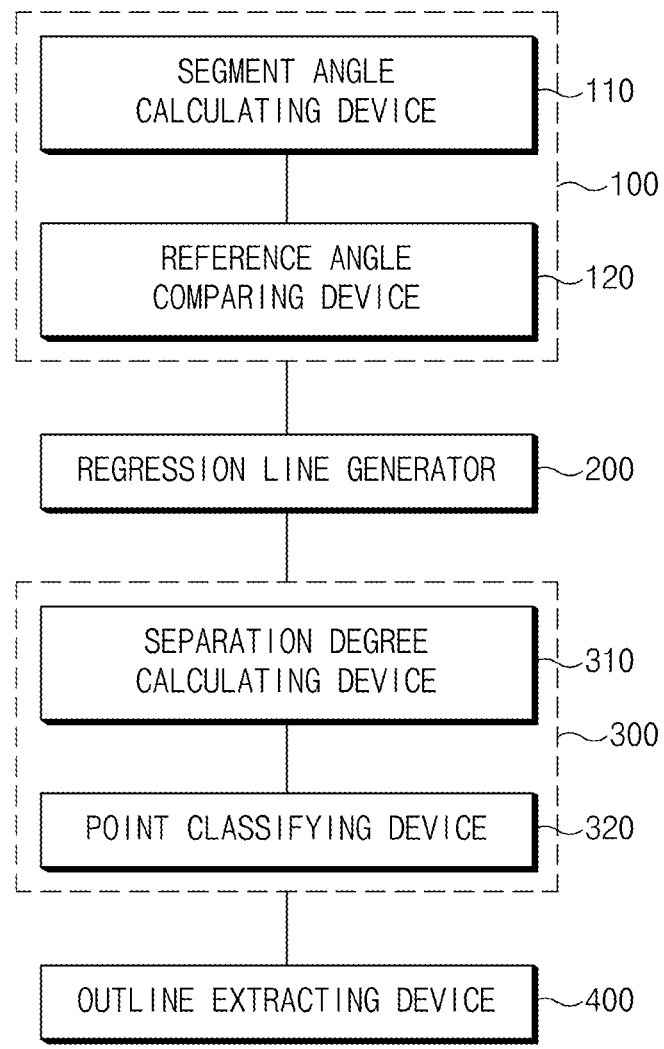
FIG. 1 is a block diagram illustrating a configuration of a system for extracting an outline of a static object according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a block diagram illustrating a configuration of a system for extracting an outline of a static object according to an embodiment of the present disclosure.

Referring to FIG. 1, the system for extracting the outline of the static object according to an embodiment of the present disclosure may include a regression line candidate selecting device 100 for selecting points forming a plurality of segments as a regression line candidate, when at least two consecutive angles, each of which is defined by a segment interconnecting points obtained from a light detection and ranging (LiDAR) sensor and another segment adjacent to the segment, are greater than a reference angle and the plurality of segments have linearity to be connected to each other, a regression line generator 200 for deriving a regression line, which is a point selection criterion, using the points forming the selected regression line candidate, a point selecting device 300 for calculating a separation distance where the point obtained from the LiDAR sensor is vertically away from the regression line, classifying the point as a removal point when the separation distance is greater than or equal to a reference distance, and classifying the point as a valid point when the separation distance is less than the reference distance, and an outline extracting device 400 for generating an outline of the static object by connecting the valid points except for the removal point.

In the present disclosure, each of the regression line candidate selecting device 100, the regression line generator 200, the point selecting device 300, and the outline extracting device 400 may be a processor or integrated into one processor, or more specifically a control unit such as an electronic control unit (ECU). However, it is not limited thereto that the regression line candidate selecting device 100, the regression line generator 200, the point selecting device 300, and the outline extracting device 400 may be any computing device which can be programmed to perform various functions.

An embodiment of the present disclosure may be to remove points caused by an object rather than a static object among points indicating a boundary of the static object generated based on data obtained from the LiDAR sensor and extract an outline of the static object at high reliability. Thus, it is obvious that points capable of distinguishing a boundary of the static object to be recognized should be obtained based on data obtained from the LiDAR sensor.

The regression line candidate selecting device 100 may include a segment angle calculating device 110 for calculating an angle defined by one segment and another segment adjacent to the one segment and a reference angle comparing device 120 for selecting a start point and an end point of segments, linearity of which is consecutively recognized, as the regression line candidate, when it is determined that at least two consecutive angles, each of which is between segments adjacent to each other, are greater than the reference angle.

In this case, the segment angle calculating device 110 may calculate an angle θ defined by a segment interconnecting points indicating an outer boundary of a static object to be recognized and another segment adjacent to the segment.

Figure 2:
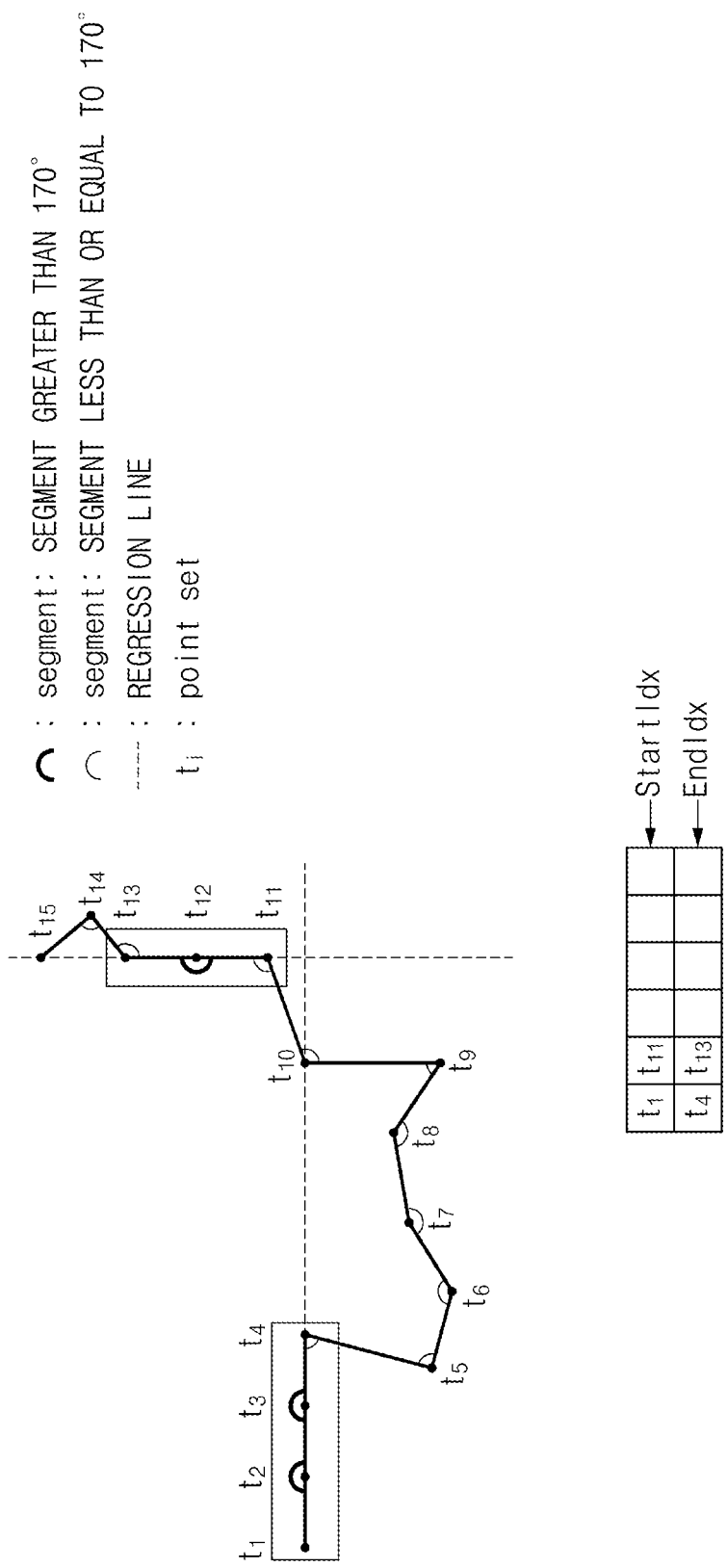
FIG. 2 is a drawing illustrating deriving a regression line candidate according to an embodiment of the present disclosure.

Thus, the segment angle calculating device 110 may generate, as shown in FIG. 2, segments interconnecting points $t_1$ to $t_{15}$ (where each point is represented as $t_i$ in FIG. 2) obtained by the LiDAR sensor and may calculate an angle between the segments adjacent to each other. In other words, the segment angle calculating device 110 may obtain an angle θ between a segment connecting points $t_{i-i}$ and $t_i$ and a segment connecting points $t_i$ and $t_{i+1}$, which is adjacent to the segment.

Furthermore, when it is determined that the angle θ obtained by the segment angle calculating device 110 is consecutively greater than the reference angle, the reference angle comparing device 120 may store locations of a start point and an end point of segments where the angle θ consecutively continues being greater than the reference angle and may select the start point and the end point as the regression line candidate.

In this case, because the reference angle comparing device 120 selects points capable of generating the regression line which is a criterion of removing a point caused by a portion protruded by a forest or the like rather than a static object, the reference angle may be set to determine whether a consecutive connection of segments has linearity.

Thus, in the embodiment shown in FIG. 2, as the reference angle selecting the regression line candidate is set to 170°, it is able to include points forming segments, only when an angle between the segments is greater than 170° and is less than or equal to 180°. However, it is obvious that the value of the reference angle is not limited to such a specific value and is able to be set in various manners within a range (e.g., the range of 160° to 180°) capable of being determined as a straight line which is not curved in the middle.

In other words, the reference angle comparing device 120 may select a start point and an end point which are arranged with continuity capable of being treated as a straight line among points indicating an outer boundary of a static object.

Referring to FIG. 2, a reference angle for selecting points which are a regression line candidate is set to when greater than 170°, and an angle between segments is represented as a thick semicircular curve when greater than 170° and the angle between the segments is represented as a thin semicircular curve when less than or equal to 170° for convenience of visual distinction.

When an angle between segments at both sides with respect to ith point $t_{i+1}$ is greater than a reference angle, 170°, the reference angle comparing device 120 of FIG. 1 may select i-lth point $t_i$, which is a start point of the segment including the ith point $t_{i+1}$, as a start point StartIdx. When an angle between segments at both sides with respect to jth point $t_{j+1}$ is less than or equal to 170° and when there is a start point StartIdx before the jth point $t_{j+1}$, the reference angle comparing device 120 may select the jth point $t_{j+1}$ as an end point EndIdx.

Thus, as shown in FIG. 2, because an angle between segments at point $t_2$ is greater than 170°, the reference angle comparing device 120 may select point $t_1$, which is a start point of the segment including point $t_2$, as the start point StartIdx. It is verified that the angle between the segments at point $t_3$ is greater than 170° and consecutively continues being greater than or equal to the reference angle. However, because the angle between the segments is greater than the reference angle, the reference angle comparing device 120 may not select point $t_3$ as the end point. Because an angle between segments at point $t_4$ is less than or equal to 170° and because there is point $t_1$, which is the start point StartIdx, before point $t_4$, the reference angle comparing device 120 may select point $t_4$ as the end point EndIdx.

Because an angle between segments at all of points $t_5$ to $t_{11}$ is less than or equal to 170°, the points may not be selected as a regression line candidate. However, because an angle between segments at point $t_{12}$ is greater than 170°, the reference angle comparing device 120 may select point $t_{11}$, which is a start point of the segment including point $t_{12}$, as the start point StartIdx. Because an angle between segments at point $t_{13}$ is less than or equal to 170° and because there is point $t_{11}$, which is the start point StartIdx, before point $t_{13}$, the reference angle comparing device 120 may select point $t_{13}$ as the end point EndIdx.

Thus, in FIG. 2, it may be seen that it is able to select a first regression line candidate composed of points $t_1$, $t_2$, $t_3$, and $t_4$ and a second regression line candidate composed of points $t_{11}$, $t_{12}$, and $t_{13}$, and they are surrounded represented with boxes. As such, it is shown on a lower portion of FIG. 2 that the start point StartIdx is selected as point $t_1$ or $t_{11}$ and the end point EndIdx is selected as point $t_4$ or $t_{13}$ in the two selected regression line candidates.

A regression line generator 200 of FIG. 1 may generate a regression line, which is a criterion of point removal and addition, using the points included in the regression line candidate selected by the reference angle comparing device 120.

The regression line generator 200 may generate the regression line by a least square method for estimating a parameter by minimizing the sum of squared deviations of locations of points actually obtained from a LiDAR sensor and a theoretically assumed expected value. As such, because minimizing the sum of squared deviations by the least square method is the most suitable method for looking for a straight line in a situation where data is distributed, it is preferable to generate a regression line for determining whether points obtained by the LiDAR sensor are distributed by such a least square method.

Figure 3:
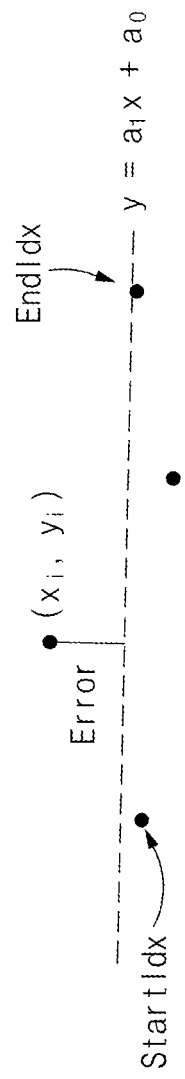
FIG. 3 is a drawing illustrating an example of a regression line generated by a least square method according to an embodiment of the present disclosure.

Thus, as shown in FIG. 3, the regression line generator 200 may perform calculation by Equations 1 to 3 to obtain coefficients $a_0$ and $a_1$ to look for a straight line ($y=a_1*x+a_0$) where the sum S of squares of the error Error ($E_i$) with points included in a corresponding regression line candidate from a start point StartIdx to an end point EndIdx becomes minimum.

In this case, because a location of each point is represented as ($x_i$, $y_i$), the regression line generator 200 may obtain an error ($E_i=y_i-a_1*x_i-a_0$) indicating a degree to which any point $t_i$, which is the regression line candidate, departs from the regression line and may obtain the sum S of squares of the error $E_i$ obtained for all points forming the regression line candidate as Equation 1 below.

$$S = \sum_{i=1}^{n} E_i^2 = \sum_{i=1}^{n}(y_i - a_0 - a_1 x_i)^2 \quad \text{[Equation 1]}$$

Thereafter, the regression line generator 200 may differentiate the sum S of squares of the error for each of coefficients $a_0$ and $a_1$ like Equation 2 below, such that the sum of squares of the error obtained by Equation 1 above becomes minimum, and may obtain $a_0$ and $a_1$ such that the value becomes "0", like Equation 3 below.

$$\frac{\partial S}{\partial a_0} = \sum_{i=1}^{n} 2(y_i - a_0 - a_1 x_i)(-1) = 0 \rightarrow \sum_{i=1}^{n} a_0 + \sum_{i=1}^{n} a_1 x_i = \sum_{i=1}^{n} y_i \quad \text{[Equation 2]}$$

$$\frac{\partial S}{\partial a_1} =$$

$$\sum_{i=1}^{n} 2(y_i - a_0 - a_1 x_i)(-x_i) = 0 \rightarrow \sum_{i=1}^{n} a_0 x_i + \sum_{i=1}^{n} a_1 x_i^2 = \sum_{i=1}^{n} x_i y_i$$

$$\begin{bmatrix} n & \sum_{i=1}^{n} x_i \\ \sum_{i=1}^{n} x_i & \sum_{i=1}^{n} x_i^2 \end{bmatrix} \begin{bmatrix} a_0 \\ a_1 \end{bmatrix} = \begin{bmatrix} \sum_{i=1}^{n} y_i \\ \sum_{i=1}^{n} x_i y_i \end{bmatrix} \rightarrow \quad \text{[Equation 3]}$$

$$a_1 = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2}$$

$$a_0 = \frac{\sum_{i=1}^{n} y_i}{n} - a_1 \frac{\sum_{i=1}^{n} x_i}{n}$$

As such, the regression line generator 200 may derive a straight line having the obtained coefficients $a_0$ and $a_1$ as the regression line generated by the regression line candidate. As the regression line is represented as, as shown in a dotted line in FIGS. 2 and 3, a long straight line over the start point and the end point forming each regression line candidate, a point selecting device 300 of FIG. 1 may measure a distance for determining a degree to which each point is vertically spaced apart from the regression line.

Such a regression line may come into contact with both the start point and the end point, and because the regression line is a straight line where the sum of squares of the error becomes minimum, as shown in FIG. 3, it is obvious that the regression line may not come into direct contact with the start point and the end point.

Furthermore, the point selecting device 300 may include a separation degree calculating device 310 for obtaining a separation distance where a point is vertically away from the regression line and a point classifying device 320 for classifying the point as a removal point, when the separation distance obtained by the separation degree calculating device 310 is greater than or equal to a reference distance, and classifying the point as a valid point, when the separation distance obtained by the separation degree calculating device 310 is less than the reference distance.

In this case, the separation degree calculating device 310 may calculate a degree to which each point obtained from the LiDAR sensor is vertically spaced apart from the regression line to obtain the separation distance from the regression line.

In this case, the separation degree calculating device 310 may obtain all of separation distances respectively away from all of regression lines generated by the regression line generator 200, as well as a separation distance away from any one regression line.

As such, the separation degree calculating device 310 may obtain all of separation distances from two regression lines to maintain a point as a valid point when the point is spaced apart from one regression line above a reference distance and is spaced apart from another regression line below the reference distance in selecting the point to be removed, thus selecting a valid point to remain irrespective of a point selection order or direction.

Figure 4:
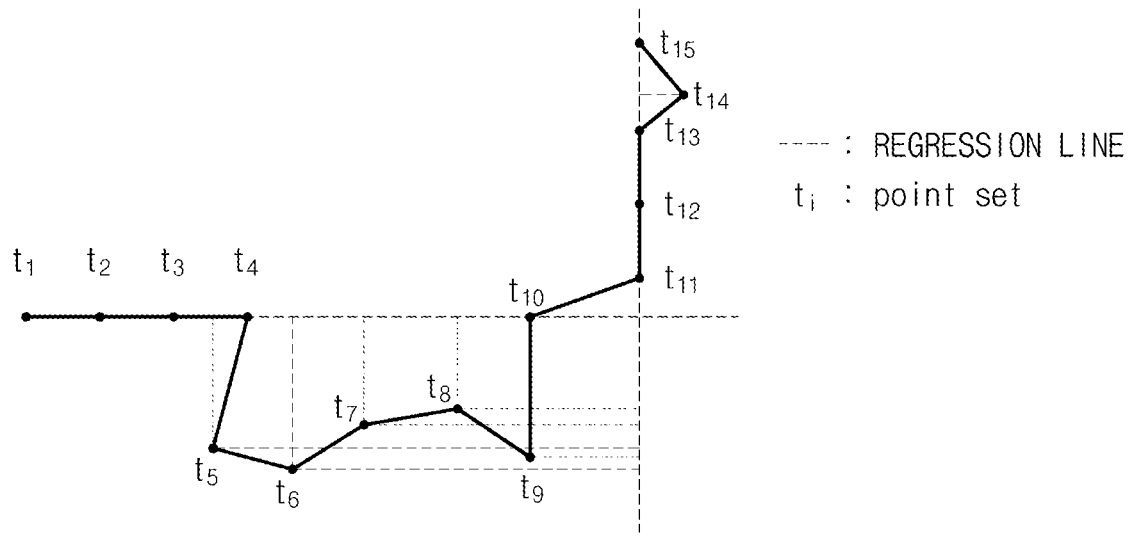
FIG. 4 is a drawing illustrating comparing distances between regression lines and points with a reference distance and selecting a point to be removed or added, according to an embodiment of the present disclosure.

Thus, as shown in FIG. 4, the separation degree calculating device 310 may obtain a separation distance from a second regression line generated with points $t_{11}$ to $t_{13}$ as well as a separation distance from a first regression line generated with $t_1$ to $t_4$ at point $t_5$. In FIG. 4, as such, a separation distance from each regression line is represented as a dotted line vertically extended to be reached from a corresponding point to each regression line.

Furthermore, the point classifying device 320 may classify a corresponding point as a removal point, when the separation distance obtained by the separation degree calculating device 310 is greater than or equal to the predetermined reference distance, and may classify the point as a valid point, when the separation distance obtained by the separation degree calculating device 310 is less than the predetermined reference distance.

To this end, the reference distance for determining whether to remove the point is set to 0.6 m in the embodiment. However, the reference distance is not limited to the setting value of the embodiment and may be set to various values (e.g., 0.3 m to 1.0 m) to extract an outline with high reliability.

In this case, the point classifying device 320 may compare each of separation distances where each point is away from a plurality of regression lines with the reference distance and may classify the point as the valid point when the separation distance from any one of the plurality of regression lines is less than the reference distance. Thus, like point $t_{10}$ shown in FIG. 4, because the separation distance from the regression line generated with points $t_{11}$ to $t_{13}$ is greater than or equal to the reference distance, but because the separation distance from the regression line generated with points $t_1$ to $t_4$ is less than the reference distance, point $t_{10}$ may be classified as the valid point to be used as one element forming an outline of a static object.

As represented in Original Points in FIG. 4, points $t_5$ to $t_9$ and point $t_{14}$ where it is determined that distances from the regression lines are greater than or equal to the reference distance among points $t_1$ to $t_{15}$ may be classified as removal points to be removed (the values are represented as "0"), and points $t_1$ to $t_4$, point $t_{10}$, points $t_{11}$ to $t_{13}$, and point $t_{15}$ where the distance from any one of the two regression lines is less than the reference distance may be classified as valid points (the location of each point is maintained without change).

Such as, as only the valid points after the removal points and the valid points are classified by the point classifying device 320 are collected, as shown in After Regression in FIG. 4, new points composed of only points $t_1$ to $t_4$, point $t_{10}$, points $t_{11}$ to $t_{13}$, and point $t_{15}$ may be obtained.

Furthermore, an outline extracting device 400 of FIG. 1 may extract an outline by connecting only the valid points which remain after removing the points spaced apart from the regression lines above the reference distance by the point classifying device 320.

Such an outline extracting device 400 may extract an outline starting at a first point and ending at a last point while sequentially connecting the remaining valid points.

As such, the outline extracting device 400 may extract an outline after removing a point obtained by a forest, a tree, or the like protruded to the outside of the static object on the basis of a degree of separation from a regression line estimated as being a main outline of the static object, thus extracting the outline with higher reliability.

An embodiment of the present disclosure is to be applied to extracting an outline of a large static object such as a building or a guardrail, which should not have an influence on determining a dynamic object such as a vehicle.

Thus, it is preferable to determine an object having a large size to the point that the size obtained by the LiDAR sensor is able to exclude a dynamic object such as a vehicle.

Furthermore, an embodiment of the present disclosure is to remove a point protruded and recognized by an object such as a forest, except for a static object to be recognized, based on the regression line, which is more suitable to extract an outline of an object in the form of a straight line than an object having a characteristic in the form of a curve. Thus, to generate a regression line and select a point according to an embodiment of the present disclosure, it is more suitable that an outline point for generating the regression line is plural in number.

The minimum size of the object is set to 13 m and a minimum number of outline points for generating the regression line is set to 3 in an embodiment of the present disclosure. However, it is obvious that the minimum size of the object and a minimum number of outline points are not limited to the embodiment and may freely increase and decrease depending on a situation to be determined.

Figure 5A:
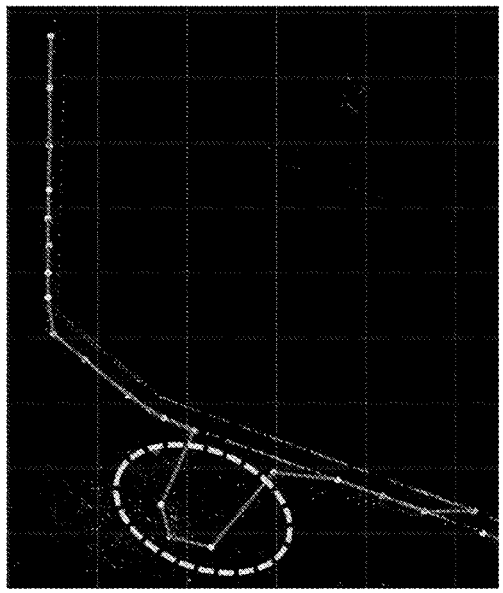
FIGS. 5A and 5B are exemplary screens illustrating removing a forest to extract an outline of a building according to an embodiment of the present disclosure.
Figure 5B:
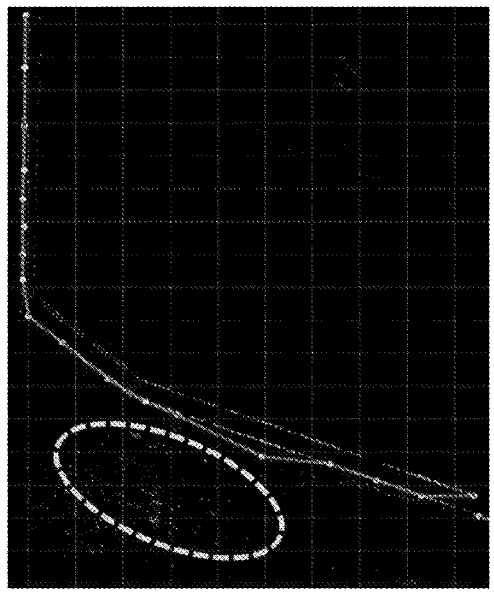
Figure 6A:
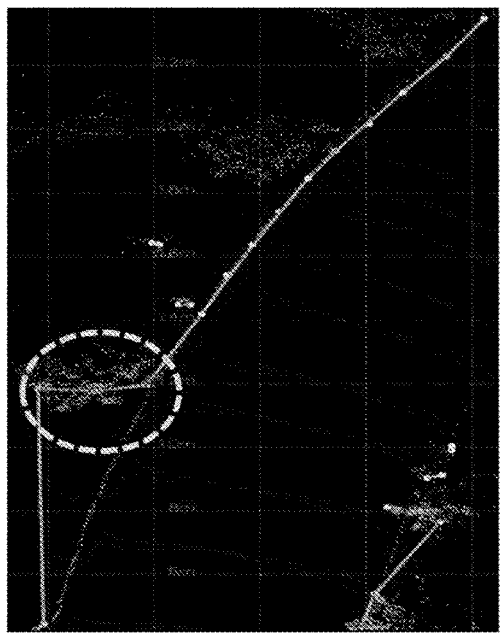
FIGS. 6A and 6B are exemplary screens illustrating removing a forest to extract an outline of a guardrail according to an embodiment of the present disclosure.
Figure 6B:
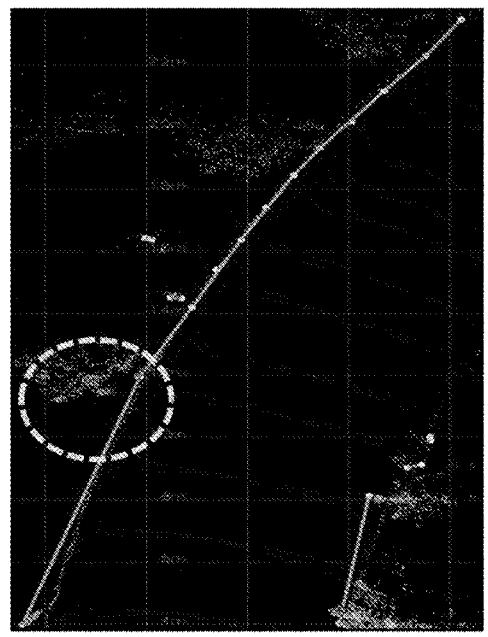

A description will be given an example of extracting an outline of a static object at high reliability according to an embodiment of the present disclosure with reference to FIGS. 5A to 6B. FIGS. 5A and 5B are exemplary screens illustrating removing a forest to extract an outline of a building according to an embodiment of the present disclosure. FIGS. 6A and 6B are exemplary screens illustrating removing a forest to extract an outline of a guardrail according to an embodiment of the present disclosure.

Since a building and a forest are clustered together to be recognized as one object in FIGS. 5A and 5B, as shown in FIG. 5A illustrating a state before correction, an outline may be extracted in a state where the forest in front of the building is included. However, when points (represented by a yellow dotted circle in FIG. 5A) spaced apart from the regression line above a reference distance are removed according to an embodiment of the present disclosure, as shown in FIG. 5B illustrating a state after the correction, an outline with high reliability, in which an area protruded and recognized by the forest is removed, may be extracted.

Furthermore, because a guardrail and a forest are clustered together to be recognized as one object in FIGS. 6A and 6B, as shown in FIG. 6A illustrating a state before correction, an outline may be extracted in a state where the forest beside the guardrail is included. However, when an outline is extracted with only valid points which remain after removing points (represented by a yellow dotted circle in FIG. 6A) spaced apart from the regression line above a reference distance according to an embodiment of the present disclosure, as shown in FIG. 6B illustrating a state after the correction, an outline with high reliability, in which an area protruded and recognized by the forest is removed, may be extracted.

Figure 7:
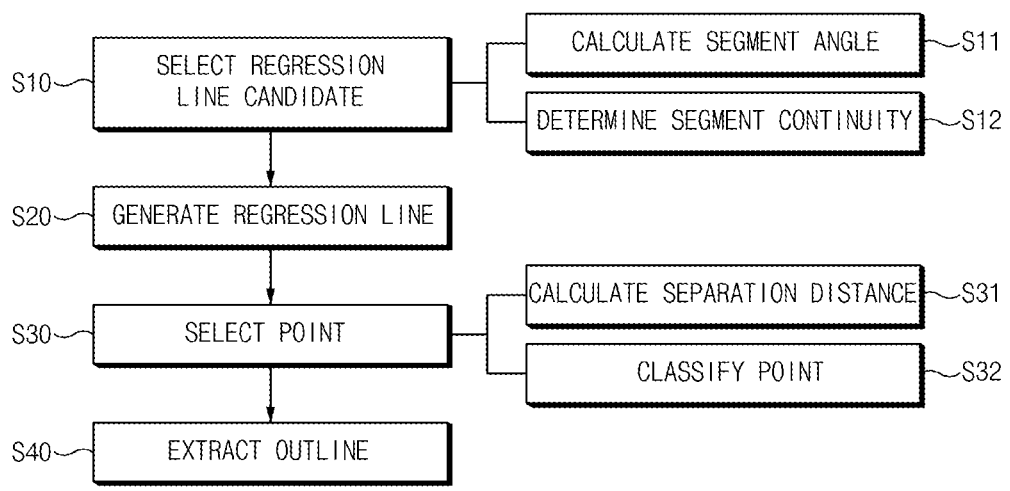
FIG. 7 is a drawing illustrating a method for extracting an outline of a static object according to an embodiment of the present disclosure.

Next, a description will be given of a method for extracting an outline of a static object according to another embodiment of the present disclosure. FIG. 7 is a drawing illustrating a method for extracting an outline of a static object according to another embodiment of the present disclosure.

Referring to FIG. 7, the method for extracting the outline of the static object according to another embodiment of the present disclosure may include selecting (S10) points forming consecutive segments as a start point and an end point to generate a regression line, when at least two segments, each of which interconnects points obtained from a LiDAR sensor, have linearity to be consecutively connected to each other, deriving (S20) a regression line, which is a selection criterion classifying a removal point and a valid point, using the start point and the end point, calculating (S30) a separation distance where the point obtained from the LiDAR sensor is vertically away from the regression line and comparing the separation distance with a reference distance to select a removal point to be deleted and a valid point to remain, and generating (S40) an outline of the static object by connecting the remaining valid points.

Step S10 may include calculating (S11) an angle $\theta$ between segments adjacent to each other and determining (S12) that segments have linearity to be consecutively connected to each other, when the at least two calculated consecutive angles $\theta$ between the segments are greater than a reference angle, and selecting the start point and the end point of the consecutive segments as a regression line candidate.

Step S11 may be to calculate the angle $\theta$ defined by a segment interconnecting the point and a point located adjacent to the point, which are obtained as indicating an outer boundary of the static object detected by the LiDAR sensor, and another segment adjacent to the segment. Thus, in S11, all of angles defined by segments consecutively interconnecting points may be calculated to obtain values thereof.

Step S12 may be to extract portions which are consecutively connected while maintaining linearity among a plurality of segments interconnecting a plurality of points.

In S12, the angle $\theta$ between the segments may be compared with the reference angle. When at least two consecutive angles are greater than the reference angle, a location of a start point in the first segment connected while maintaining the state where the angle θ is greater than the reference angle and a location of an end point in a last segment may be stored and the start point and the end point may be selected as a regression line candidate.

The embodiment sets the reference angle to 170° and determines whether the angle θ between segments is greater than or is less than or equal to the reference angle to determine whether linearity of the segments is maintained. However, it is obvious that it is not limited to a specific value of the reference angle selected as an embodiment among various settable values (e.g., values which belong to the range of 160° to 180°).

Step S20 may be to derive a straight line ($y=a_1*x+a_0$) where the sum S of squares of the error $E_i$ with points located between the start point and the end point becomes minimum by a least square method. In this case, as described above, coefficients $a_0$ and $a_1$ of the regression line may be obtained by performing calculation by Equations 1 to 3.

Step S30 may include calculating (S31) the separation distance which is a degree to which each of the points obtained from the LiDAR sensor is vertically away from the regression line and classifying (S32) the point as a removal point, when the separation distance is greater than or equal to the reference distance, and classifying the point as a valid point, when the separation distance is less than the reference distance.

Step S31 may be to calculate a degree to which each of the points obtained from the LiDAR sensor is vertically away from the regression line to calculate the separation distance from the regression line.

In this case, in S31, all of separation distances where respective points are away from all the regression lines generated in S20 may be calculated.

Step S32 may be to compare the separation distance with the predetermined reference distance, classify the point as a removal point to be removed, when the separation distance of the point is greater than or equal to the reference distance, and classify the point as a valid point to include the point in the outline of the static object, when the separation distance of the point is less than the reference distance.

In this case, the embodiment sets the reference distance for determining whether to remove the point to 0.6 m and removes the point based on whether the separation distance is greater than or equal to 0.6 m or is less than 0.6 m. However, it is not limited to the specific value of the reference distance selected as an embodiment among various settable values (e.g., values which belong to the range of 0.3 m to 1.0 m).

Step S32 may be to compare each of separation distances where each point is away from a plurality of regression lines with the reference distance and classify the point as a valid point when the separation distance from any one of the plurality of separation distances is less than the reference distance. Thus, the valid point may accurately remain without being affected by an order or direction where the point is compared with the regression line.

Step S40 may be to form a line starting at a first point and ending at a last point while sequentially connecting remaining valid points to extract the outline of the static object to be recognized.

As such, an embodiment of the present disclosure may generate a regression line using points forming segments, linearity of which is consecutively maintained, classify a removal point and a valid point depending on a degree to which each point is spaced apart from the regression line, and may extract an outline of a static object by connecting only remaining valid points.

Thus, an embodiment of the present disclosure may selectively remove points, which are generated by a forest or a tree to protrude to the outside and degrade linearity the outline of the static object itself has, thus extracting the outline of the static object at higher reliability.

An embodiment of the present disclosure may remove points generated by a forest or the like protruded to the outside of a static object depending on a degree of separation from a regression line estimated from linearity of segments, thus extracting an outline of the static object at higher reliability.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system for extracting an outline of a static object, the system comprising:
    a light detection and ranging (LiDAR) sensor configured to obtain a plurality of points and
    a processor coupled to the LiDAR, and configured to:
        derive a regression line being a point selection criterion, based on linearity of segments interconnecting the points obtained from the LiDAR sensor;
        calculate a separation distance where each point is vertically away from the regression line, when the separation distance is greater than or equal to a reference distance, classify the points as removal points,
        when the separation distance is less than the reference distance, classify the points as valid points;
        generate and extract the outline of the static object by connecting the classified valid points except for the classified removal points, and wherein the processor coupled to the LiDAR is further configured to:
        determine that a plurality of consecutive segments, of the segments, linearity, when at least two consecutive angles, each of which is defined by a segment and another segment adjacent to the segment, are greater than a reference angle; and
        select points forming the determined plurality of consecutive segments as a regression line candidate;
        calculate an angle defined by one segment and another segment adjacent to the segment among the determined plurality of consecutive segments;
        select an i-1th point, which is a start point of a segment including an ith point, as the start point of the regression line candidate, when an angle between segments at both sides with respect to the ith point is greater than the reference angle, select a jth point as the end point of the regression line candidate, when an angle between segments at both sides with respect to the jth point is less than or equal to the reference angle and when there is the start point before the jth point, and select the selected start point and the selected end point of the segments to form a line as the regression line candidate which is the derived regression line.

2. The system of claim 1, wherein the processor is further configured to set the reference angle within a range of 1600 to 1800.

3. The system of claim 1, wherein the processor is further configured to generate the regression line, in which a sum of squares of an error with points included in the regression line candidate from the selected start point to the selected end point becomes minimum, by a least square method.

4. The system of claim 1, wherein the processor is further configured to: obtain the separation distance where each point is vertically away from the regression line; and classify the points as the removal points, when the separation distance is greater than or equal to the reference distance, and classify the points as the valid points, when the separation distance is less than the reference distance.

5. The system of claim 4, wherein the processor is further configured to obtain each of the separation distances in which the each point is away from all of the derived regression lines generated by the processor.

6. The system of claim 5, wherein the processor is further configured to classify the points as the valid points, when the separation distance from any one of the regression lines is less than the reference distance.

7. The system of claim 4, wherein the processor is further configured to set the reference distance within a range of 0.3 m to 1.0 m.

8. A method for extracting an outline of a static object, the method comprising:

deriving a regression line being a point selection criterion, using points forming consecutive segments, when the segments interconnecting the points obtained from a LiDAR sensor have linearity to be consecutively connected to each other;

calculating a separation distance where each point is vertically away from the regression line and comparing the separation distance with a reference distance to select a removal point to be deleted and a valid point to remain; and generating and extracting the outline of the static object by connecting the remaining valid points, wherein the method further comprising:

selecting points among the points forming consecutive segments, of the segments, as the start point and the end point to generate the regression line, when at least two segments have linearity to be consecutively connected to each other wherein the selecting of the points forming the consecutive segments as the start point and the end point includes:

calculating an angle between the segments adjacent to each other, selecting an i-1th point, which is a start point of a segment including an ith point, as the start point of the regression line, when an angle between segments at both sides with respect to the ith point is greater than the reference angle, and selecting a jth point as the end point of the regression line, when an angle between segments at both sides with respect to the jth point is less than or equal to the reference angle and when there is the start point before the jth point.

9. The method of claim 8, wherein the selecting of the start point and the end point of the consecutive segments as the regression line is to set the reference angle within a range of 1600 to 1800.

10. The method of claim 8, wherein the deriving of the regression line is to generate the regression line, where a sum of squares of an error with the points included in the regression line from the start point to the end point becomes minimum, by a least square method.

11. The method of claim 8, wherein the selecting of the removal point to be deleted and the valid point to remain includes:

calculating the separation distance which is a degree to which each point is vertically away from the regression line;

classifying the point as the removal point, when the separation distance is greater than or equal to the reference distance; and classifying the each point as the valid point, when the separation distance is less than the reference distance.

12. The method of claim 11, wherein the calculating of the separation distance is to calculate all of the separation distances where the each point is away from all of the regression lines.

13. The method of claim 11, wherein the classifying of each point as the valid point is to classify each point as the valid point, when the separation distance from any one regression line is less than the reference distance.

14. The method of claim 11, wherein the classifying of each point as the valid point is to set the reference distance within a range of 0.3 m to 1.0 m.

* * * * *